(12) United States Patent
Guen (10) Patent No.: US 9,054,371 B2
(45) Date of Patent: Jun. 9, 2015

(54) RECHARGEABLE BATTERY

(75) Inventor: Min-Hyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/563,028

(22) Filed: Jul. 31, 2012

(65) Prior Publication Data

US 2013/0130072 A1    May 23, 2013

(30) Foreign Application Priority Data

Nov. 17, 2011    (KR) .................... 10-2011-0120472

(51) Int. Cl.
*H01M 2/12* (2006.01)
*H01M 2/34* (2006.01)
*H01M 2/04* (2006.01)

(52) U.S. Cl.
CPC .............. *H01M 2/345* (2013.01); *H01M 2/043* (2013.01); *H01M 2/0473* (2013.01); *H01M 2200/20* (2013.01)

(58) Field of Classification Search
USPC .......................................... 429/53, 56, 59, 61
See application file for complete search history.

(56) References Cited

U.S. PATENT DOCUMENTS

| | | | |
|---|---|---|---|
| 4,209,571 A | 6/1980 | Bessett et al. | |
| 4,945,014 A | 7/1990 | Miyabayashi et al. | |
| 5,143,860 A | 9/1992 | Mitchell et al. | |
| 5,523,178 A | 6/1996 | Murakami et al. | |
| 5,707,756 A | 1/1998 | Inoue et al. | |
| 5,766,793 A | 6/1998 | Kameishi et al. | |
| 5,800,937 A | 9/1998 | Decker et al. | |
| 6,005,469 A | 12/1999 | Kalapodis et al. | |
| 6,083,792 A | 7/2000 | Sung | |
| 6,143,440 A | 11/2000 | Volz et al. | |
| 6,342,826 B1 | 1/2002 | Quinn et al. | |
| 6,399,237 B1 | 6/2002 | Souliac et al. | |
| 6,403,250 B1 | 6/2002 | Azema et al. | |

(Continued)

FOREIGN PATENT DOCUMENTS

| | | |
|---|---|---|
| CN | 1395328 A | 2/2003 |
| CN | 1481039 A | 3/2004 |

(Continued)

OTHER PUBLICATIONS

European Search Report dated Sep. 28, 2012 for EP 12 17 9697.3-2119, 6 pages.

(Continued)

*Primary Examiner* — Jonathan G Leong
*Assistant Examiner* — James Erwin
(74) *Attorney, Agent, or Firm* — Christie, Parker & Hale, LLP (57) ABSTRACT

A rechargeable battery including: an electrode assembly including a first electrode and a second electrode; a case containing the electrode assembly; a cap plate coupled to the case; a short-circuit tab electrically connected to the first electrode; and a short-circuit member electrically connected to the second electrode and configured to contact the short-circuit tab according to an increase of an internal pressure of the rechargeable battery, and the short-circuit member includes a connection portion having a plate shape, a support portion at an outer side of the connection portion, and a variable groove having a shape that is configured to change according to the increase of the internal pressure.

13 Claims, 9 Drawing Sheets

(56) References Cited

U.S. PATENT DOCUMENTS

| | | |
|---|---|---|
| 6,509,115 B2 | 1/2003 | Kim et al. |
| 6,525,371 B2 | 2/2003 | Johnson et al. |
| 6,562,493 B2 | 5/2003 | Tsukada et al. |
| 6,642,110 B2 | 11/2003 | Jung et al. |
| 6,753,104 B2 | 6/2004 | Kitoh |
| 6,899,972 B2 | 5/2005 | Cho |
| 7,351,496 B2 | 4/2008 | Nakanishi et al. |
| 7,601,455 B2 | 10/2009 | Yoon |
| 7,666,544 B2 | 2/2010 | Barrault et al. |
| 8,043,737 B2 | 10/2011 | Kim |
| 8,415,052 B2 | 4/2013 | Yoshida et al. |
| 2002/0052080 A1 | 5/2002 | Lee |
| 2002/0142543 A1 | 10/2002 | Lin et al. |
| 2003/0013005 A1 | 1/2003 | Chang |
| 2003/0027036 A1 | 2/2003 | Emori et al. |
| 2003/0027044 A1 | 2/2003 | Asahina et al. |
| 2003/0151868 A1 | 8/2003 | Inae et al. |
| 2004/0092167 A1 | 5/2004 | Barrault et al. |
| 2004/0126650 A1 | 7/2004 | Kim |
| 2004/0170887 A1 | 9/2004 | Masumoto et al. |
| 2004/0234842 A1 | 11/2004 | Kawano et al. |
| 2005/0112455 A1* | 5/2005 | Marubayashi et al. ......... 429/56 |
| 2005/0112456 A1 | 5/2005 | Kozu et al. |
| 2005/0124133 A1 | 6/2005 | Tu |
| 2005/0269622 A1 | 12/2005 | Klinger et al. |
| 2006/0099500 A1 | 5/2006 | Jeon |
| 2007/0077706 A1 | 4/2007 | Orlowski et al. |
| 2007/0122691 A1 | 5/2007 | Lee et al. |
| 2007/0166605 A1 | 7/2007 | Meguro et al. |
| 2007/0182020 A1 | 8/2007 | Trezza et al. |
| 2007/0212595 A1* | 9/2007 | Kim et al. ....................... 429/53 |
| 2007/0269711 A1 | 11/2007 | Meguro et al. |
| 2008/0070067 A1 | 3/2008 | Jang et al. |
| 2008/0145748 A1 | 6/2008 | Jung |
| 2008/0213657 A1 | 9/2008 | Qi et al. |
| 2009/0087733 A1 | 4/2009 | Yoon et al. |
| 2009/0305126 A1 | 12/2009 | Choi et al. |
| 2010/0028762 A1 | 2/2010 | Yokoyama et al. |
| 2010/0081048 A1 | 4/2010 | Nansaka et al. |
| 2010/0136388 A1 | 6/2010 | Kim et al. |
| 2010/0167107 A1 | 7/2010 | Byun et al. |
| 2010/0227205 A1 | 9/2010 | Byun et al. |
| 2010/0279156 A1 | 11/2010 | Kim et al. |
| 2010/0291421 A1 | 11/2010 | Byun et al. |
| 2011/0039136 A1* | 2/2011 | Byun et al. ....................... 429/56 |
| 2011/0135976 A1* | 6/2011 | Byun ............................... 429/56 |
| 2011/0136004 A1 | 6/2011 | Kwak et al. |
| 2011/0177387 A1 | 7/2011 | Byun et al. |
| 2011/0183193 A1 | 7/2011 | Byun et al. |
| 2011/0244280 A1 | 10/2011 | Byun et al. |

FOREIGN PATENT DOCUMENTS

| | | |
|---|---|---|
| EP | 0 313 405 A1 | 4/1989 |
| EP | 1 076 350 A2 | 2/2001 |
| EP | 1 717 886 A2 | 11/2006 |
| EP | 1 901 369 A1 | 3/2008 |
| EP | 2 284 932 A1 | 2/2011 |
| EP | 2 287 942 A1 | 2/2011 |
| EP | 2 299 512 A1 | 3/2011 |
| EP | 2 333 871 A1 | 6/2011 |
| EP | 2 348 558 A1 | 7/2011 |
| EP | 2 357 685 A1 | 8/2011 |
| JP | 05-062664 | 3/1993 |
| JP | 05-251290 | 9/1993 |
| JP | 05-275088 | 10/1993 |
| JP | 06-290767 | 10/1994 |
| JP | 07-037572 | 2/1995 |
| JP | 07-201372 | 8/1995 |
| JP | 08-050920 | 2/1996 |
| JP | 08-185850 | 7/1996 |
| JP | 09-106804 | 4/1997 |
| JP | 10-074500 | 3/1998 |
| JP | 10-188946 | 7/1998 |
| JP | 10-208725 | 8/1998 |
| JP | 10-326610 | 12/1998 |
| JP | 11-007931 | 1/1999 |
| JP | 11-040203 | 2/1999 |
| JP | 11-273651 | 10/1999 |
| JP | 11-307076 | 11/1999 |
| JP | 2000-082457 | 3/2000 |
| JP | 2000-182598 | 6/2000 |
| JP | 2001-202946 | 7/2001 |
| JP | 2001-357834 | 12/2001 |
| JP | 2002-216743 | 8/2002 |
| JP | 2003-051303 | 2/2003 |
| JP | 2003-051304 | 2/2003 |
| JP | 2003-092103 | 3/2003 |
| JP | 2003-178745 | 6/2003 |
| JP | 2003-197178 | 7/2003 |
| JP | 2003-223886 | 8/2003 |
| JP | 2003-308815 | 10/2003 |
| JP | 2004-022477 | 1/2004 |
| JP | 2004-087194 | 3/2004 |
| JP | 2004-521459 | 7/2004 |
| JP | 2004-273139 | 9/2004 |
| JP | 2004-319463 | 11/2004 |
| JP | 2005-032477 | 2/2005 |
| JP | 2005-044626 | 2/2005 |
| JP | 2005-166584 | 6/2005 |
| JP | 2006-012602 | 1/2006 |
| JP | 2006-147180 | 6/2006 |
| JP | 2008-27668 | 2/2008 |
| JP | 2008-177084 | 7/2008 |
| JP | 2008-186591 | 8/2008 |
| JP | 2008-218132 | 9/2008 |
| JP | 2009-105075 | 5/2009 |
| JP | 2010-033777 | 2/2010 |
| JP | 2010-097822 | 4/2010 |
| JP | 2011-018645 | 1/2011 |
| JP | 2011-124214 | 6/2011 |
| JP | 2011-154991 | 8/2011 |
| JP | 2011-210717 | 10/2011 |
| KR | 20-1999-0031054 U | 7/1999 |
| KR | 10-2001-0011900 | 2/2001 |
| KR | 10-2001-0021236 | 3/2001 |
| KR | 10-2006-0020211 | 3/2006 |
| KR | 10-2006-0039955 | 5/2006 |
| KR | 10-0693115 B1 | 3/2007 |
| KR | 10-2007-0122471 | 12/2007 |
| KR | 10-0870349 B1 | 11/2008 |
| KR | 10-2009-0097599 | 9/2009 |
| KR | 10-2010-0036164 | 4/2010 |
| KR | 10-2010-0052885 | 5/2010 |
| KR | 10-2010-0062886 A | 6/2010 |
| KR | 10-2010-0076699 | 7/2010 |
| KR | 10-2010-0088021 | 8/2010 |
| KR | 10-2010-0099983 | 9/2010 |
| KR | 10-2010-0123598 | 11/2010 |
| KR | 10-2011-0005197 A | 1/2011 |
| KR | 10-2011-0017820 | 2/2011 |
| KR | 10-2011-0030043 A | 3/2011 |
| KR | 10-1042808 B1 | 6/2011 |
| KR | 10-2011-0136166 | 12/2011 |
| WO | WO 02/071510 A1 | 9/2002 |
| WO | WO 2007/126243 A1 | 11/2007 |

OTHER PUBLICATIONS

KIPO Office action dated Jan. 17, 2012 for Korean Patent application 10-2010-0068019, (9 pages).

KIPO Office action dated Mar. 19, 2012 for Korean Patent application 10-2010-0062270, (5 pages).

KIPO Office action dated Jun. 18, 2012 for Korean Patent application 10-2011-0003951, (4 pages).

KIPO Office action dated Aug. 13, 2012 for Korean Patent application 10-2011-0036267, (4 pages).

KIPO Office action dated Oct. 8, 2012, for Korean Patent application 10-2011-0050510, (4 pages).

KIPO Office action dated Apr. 4, 2012 for Korean Patent application 10-2010-0062874, (5 pages).

KIPO Notice of Allowance dated Oct. 26, 2012, for Korean Patent application 10-2010-0052011, (5 pages).

(56) References Cited

OTHER PUBLICATIONS

KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
KIPO Letters Patent dated Dec. 15, 2011, for Korean Patent application 10-2009-0116065, (11 pages).
EPO Search Report dated Aug. 16, 2010 for European Patent application 101685263.1, (6 pages).
EPO Search Report dated Aug. 19, 2010 for European Patent application 10164550.5, (8 pages).
EPO Search Report dated Aug. 19, 2010 for European Patent application 10167890.2, (7 pages).
EPO Search Report dated Oct. 13, 2010 for European Patent application 10169791, (6 pages).
EPO Search Report dated Dec. 14, 2012 for European Patent application 12160354.2, (5 pages).
EPO Search Report dated Sep. 29, 2011 for European Patent application 11169286.9, (5 pages).
EPO Search Report dated Feb. 29, 2012 for European Patent application 11165265.7, (5 pages).
EPO Search Report dated Oct. 2, 2012 for European Patent application 11178263.7, (7 pages).
EPO Search Report dated Dec. 20, 2012 for European Patent application 12178835.0, (6 pages).
EPO Office action dated Feb. 8, 2011 for European Patent application 10168526.1, (4 pages).
EPO Office action dated Mar. 7, 2011 for European Patent application 10164550.5, (5 pages).
EPO Office action dated Apr. 21, 2011 for European Patent application 10169791, (6 pages).
EPO Office action dated Jul. 19, 2011 for European Patent application 10170406.2 (3 pages).
EPO Office action dated Apr. 20, 2011 for European Patent application 10167890.2, (6 pages).
EPO Office action dated Aug. 17, 2011 for European Patent application 10164550.5, (8 pages).
EPO Office action dated Mar. 22, 2012 for European Patent application 101164550.5 (4 pages).
EPO Office action dated Jul. 27, 2012 for European Patent application 10164550.5 (5 pages).
JPO Office action dated Aug. 28, 2012, for Japanese Patent application 2010-170281, (2 pages).
JPO Office action dated Feb. 5, 2013, for Japanese Patent application 2010-154142, (2 pages).
JPO Office action dated Apr. 30, 2013, for Japanese Patent application 2011-115662, (2 pages).
JPO Office action dated Jun. 4, 2013, for Japanese Patent application 2011-170959, (3 pages).
JPO Office action dated Sep. 24, 2013, for Japanese Patent application 2011-170959, (3 pages).
SIPO Office action dated Jan. 22, 2013, with English translation for Chinese Patent application 201010220632.0, (20 pages).
SIPO Office action dated Apr. 12, 2013, with English translation, for Chinese Patent application 201010135715.X, (20 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
SIPO Office action dated Dec. 4, 2013, with English translation for Chinese Patent application 201110207662.2, (20 pages).
SIPO Office action dated Aug. 27, 2012, with English translation, for Chinese Patent application 201010135715.X, (16 pages).
Korean Patent Abstracts for Korean Publication 10-2008-0084416 dated Sep. 19, 2008, corresponding to Korean Patent 10-0870349 dated Nov. 25, 2008, listed above.
U.S. Notice of Allowance dated Sep. 23, 2013, for cross reference U.S. Appl. No. 13/210,124, (15 pages).
U.S. Notice of Allowance dated Jan. 29, 2014, for cross reference U.S. Appl. No. 12/781,656, (7 pages).
U.S. Notice of Allowance dated Mar. 20, 2014, for cross reference U.S. Appl. No. 12/781,656, (14 pages).
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
U.S. Office action dated May 6, 2013, for cross reference U.S. Appl. No. 13/077,640, (17 pages).
U.S. Office action dated Aug. 17, 2010, for cross reference U.S. Appl. No. 12/626,582, (11 pages).
U.S. Office action dated Nov. 23, 2010, for cross reference U.S. Appl. No. 12/626,582, (10 pages).
U.S. Office action dated Feb. 1, 2013, for cross reference U.S. Appl. No. 12/781,656, (17 pages).
U.S. Office action dated Jul. 3, 2013, for cross reference U.S. Appl. No. 12/781,656, (15 pages).
U.S. Office action dated Oct. 1, 2013, for cross reference U.S. Appl. No. 13/396,463, (15 pages).
U.S. Office action dated Nov. 21, 2013, for cross reference U.S. Appl. No. 13/077,640, (16 pages).
U.S. Office action dated Nov. 14, 2013, for cross reference U.S. Appl. No. 12/781,656, (20 pages).
Patent Abstracts of Japan, and English machine translation of Japanese Publication 05-062664, dated Mar. 12, 1993, (11 pages).
Patent Abstracts of Japan, and English machine translation of Japanese Publication 05-251290, dated Sep. 28, 1993, (5 pages).
Patent Abstracts of Japan, and English machine translation of Japanese Publication 05-275088, dated Oct. 22, 1993, (6 pages).
Patent Abstracts of Japan, and English machine translation of Japanese Publication 06-290767, dated Oct. 18, 1994, (13 pages).
Patent Abstracts of Japan, and English machine translation of Japanese Publication 07-037572, dated Feb. 7, 1995, (5 pages).
Patent Abstracts of Japan, and English machine translation of Japanese Publication 07-201372, dated Aug. 4, 1995, (5 pages).
Patent Abstracts of Japan, and English machine translation of Japanese Publication 08-050920, dated Feb. 20, 1996, (14 pages).
Patent Abstracts of Japan, and English machine translation of Japanese Publication 08-185850, dated Jul. 16, 1996, (11 pages), also Corresponds to U.S. Patent 6,753,104 listed above.
Patent Abstracts of Japan, and English machine translation of Japanese Publication 10-188946, dated Jul. 21, 1998, (8 pages), also Corresponds to U.S. Patent 7,666,544 listed above.
Patent Abstracts of Japan, and English machine translation of Japanese Publication 10-208725, Aug. 7, 1998, (10 pages).
Patent Abstracts of Japan, and English machine translation of Japanese Publication 10-326610, dated Dec. 8, 1998 (10 pages).
Patent Abstracts of Japan, and English machine translation of Japanese Publication 11-040203, Feb. 12, 1999, (12 pages).
Patent Abstracts of Japan, and English machine translation of Japanese Publication 11-273651, Oct. 8, 1999, (12 pages).
Patent Abstracts of Japan, and English machine translation of Japanese Publication 11-307076, dated Nov. 5, 1999, (6 pages).
Patent Abstracts ofJapan, and English machine translation of Japanese Publication 2000-082457, Mar. 21, 2000, (13 pages).
Patent Abstracts of Japan, and English machine translation of Japanese Publication 2000-182598, dated Jun. 30, 2000, (21 pages).
Patent Abstracts of Japan, and English machine translation of Japanese Publication 2001-202946, dated Jul. 27, 2001, (8 pages).
Patent Abstracts of Japan, and English machine translation of Japanese Publication 2001-357834, dated Dec. 26, 2001, (15 pages).
Patent Abstracts of Japan, and English machine translation of Japanese Publication 2002-216743, dated Aug. 2, 2002, (10 pages).
Patent Abstracts of Japan, and English machine translation of Japanese Publication 2003-051304, dated Feb. 21, 2003, (19 pages).
Patent Abstracts of Japan, and English machine translation of Japanese Publication 2003-092103, dated Mar. 28, 2003, (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated Aug. 8, 2003 , (10 pages).
Patent Abstracts of Japan, and English machine translation of Japanese Publication 2004-022477, Jan. 22, 2004, (7 pages).

(56) References Cited

OTHER PUBLICATIONS

Patent Abstracts of Japan, and English machine translation of Japanese Publication 2004-087194, Mar. 18, 2004, (10 pages).
Patent Abstracts of Japan, and English machine translation of Japanese Publication 2004-273139, Sep. 30, 2004, (24 pages).
Patent Abstracts of Japan, and English machine translation of Japanese Publication 2004-319463, Nov. 11, 2004, (13 pages).
Patent Abstracts of Japan, and English machine translation of Japanese Publication 2005-032477, dated, Feb. 3, 2005, (11 pages).
Patent Abstracts of Japan, and English machine translation of Japanese Publication 2005-044626, dated Feb. 17, 2005, (21 pages).
Patent Abstracts of Japan, and English machine translation of Japanese Publication 2006-012602, dated Jan. 12, 2006, (10 pages).
Patent Abstracts of Japan, and English machine translation of Japanese Publication 2008-027668, dated Feb. 7, 2008, (13 pages).
Patent Abstracts of Japan, and English machine translation of Japanese Publication 2008-177084, dated Jul. 31, 2008, (11 pages).
Patent Abstracts of Japan, and English machine translation of Japanese Publication 2008-186591, Aug. 14, 2008, (14 pages).
Patent Abstracts of Japan, and English machine translation of Japanese Publication 2008-218132, Sep. 18, 2008, (10 pages).
Patent Abstracts of Japan, and English machine translation of Japanese Publication 2009-105075, dated May 14, 2009, (10 pages).
Patent Abstracts of Japan, and English machine translation of Japanese Publication 2010-033777, Feb. 12, 2010, (16 pages).
Patent Abstracts of Japan, and English machine translation of Japanese Publication 2010-097822, dated Apr. 30, 2010, (24 pages).
Patent Abstracts of Japan, and English machine translation of Japanese Publication 2011-018645, dated Jan. 27, 2011, (15 pages).
U.S. Office Action dated Apr. 8, 2014, for cross reference U.S. Appl. No. 13/396,463 (7 pages).
U.S. Office action dated Jun. 4, 2014, for cross reference U.S. Appl. No. 13/077,640, (25 pages).
U.S. Office action dated May 20, 2014, for cross reference U.S. Appl. No. 12/626,582, (26 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
U.S. Notice of Allowance dated Apr. 13, 2012, for cross reference U.S. Appl. No. 12/634,000, (10 pages).
U.S. Notice of Allowance dated Jun. 27, 2014, for cross reference U.S. Appl. No. 12/781,656, (7 pages).
SIPO Office action dated May 19, 2014, with English translation, for Chinese application 201110207662.2, (16 pages).
SIPO Office action dated Oct. 8, 2014, with English translation, for corresponding Chinese Patent application 201110207662.2, (8 pages).
KIPO Office action dated Nov. 20, 2012 for Korean Patent application 10-2011-0073880, (8 pages).
U.S. Notice of Allowability dated Aug. 19, 2014, for cross reference U.S. Appl. No. 12/781,656 (2 pages).
U.S. Office action dated Oct. 16, 2014, for cross reference U.S. Appl. No. 12/626,582 (18 pages).
U.S. Office action dated Oct. 21, 2014, for cross reference U.S. Appl. No. 13/396,463 (27 pages).
U.S. Office action dated Nov. 24, 2014, for cross reference U.S. Appl. No. 13/077,640, (18 pages).
U.S. Notice of Allowance dated Dec. 19, 2014, for cross reference U.S. Appl. No. 13/333,869, (21 pages).
SIPO Office action dated Dec. 22, 2014, with English translation, for corresponding Chinese Patent application 201010135715.X, (15 pages).

* cited by examiner

RECHARGEABLE BATTERY

CROSS-REFERENCE TO RELATED APPLICATION

This application claims priority to and the benefit of Korean Patent Application No. 10-2011-0120472, filed on Nov. 17, 2011 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery that cannot be recharged. A low-capacity rechargeable battery is typically used for a small portable electronic device such as a mobile phone, a laptop computer, and a camcorder. A large-capacity rechargeable battery is widely used as a power supply for driving a motor of a hybrid vehicle, an electric vehicle, and the like.

Recently, a high-power rechargeable battery using a non-aqueous electrolyte having high energy density has been developed, and the high-power rechargeable battery is configured as a large-capacity battery module by connecting a plurality of rechargeable batteries in series so as to be used for devices requiring large amounts of power, such as a motor drive of an electric vehicle, a hybrid vehicle, and the like.

Further, one battery module is configured by a plurality of rechargeable batteries which are generally connected to each other in series, and the rechargeable battery may be formed in a cylindrical shape, a prismatic or square shape, or the like.

If an abnormal reaction occurs in a rechargeable battery having a case formed of a material such as a metal, an internal pressure may be increased, and there is a risk of ignition or explosion.

The above information disclosed in this Background section is provided only for enhancement of understanding of the background of the described technology, and therefore it may contain information that does not form the prior art that is already known in this country to a person of ordinary skill in the art.

SUMMARY

According to an aspect of embodiments of the present invention, a rechargeable battery has an improved safety apparatus. As such, a rechargeable battery according to embodiments of the present invention is suited for application in an electric vehicle or a hybrid electric vehicle.

According to an exemplary embodiment of the present invention, a rechargeable battery includes: an electrode assembly including a first electrode and a second electrode; a case containing the electrode assembly; a cap plate coupled to the case; a short-circuit tab electrically connected to the first electrode; and a short-circuit member electrically connected to the second electrode and configured to contact the short-circuit tab according to an increase of an internal pressure of the rechargeable battery, and the short-circuit member includes a connection portion having a plate shape, a support portion at an outer side of the connection portion, and a variable groove having a shape that is configured to change according to the increase of the internal pressure.

The support portion may include an edge portion having a ring shape, and a driving portion at an inner side of the edge portion and inclined with respect to the edge portion. The variable groove may be formed at a corner where the edge portion and the driving portion meet each other. A width of the variable groove may decrease as the connection portion rises according to the increase of the internal pressure.

The variable groove may include a first variable groove formed at a corner where the edge portion and the driving portion meet each other, and the short-circuit member may further include a second variable groove formed in a portion where the connection portion and the driving portion meet each other.

The short-circuit member may be partially inserted in a short-circuit groove formed in the cap plate, and electrically connected with the second electrode through the cap plate.

The connection portion may have an arc-shaped cross-section protruding toward the short-circuit tab. The connection portion may include a protrusion at a center portion of the connection portion such that a thickness of the center portion of the connection portion is greater than a thickness of a peripheral portion of the connection portion.

The support portion may include an edge portion having a ring shape, a first driving portion at an inner side of the edge portion and inclined with respect to the edge portion, and a second driving portion at an inner side of the first driving portion and inclined with respect to the first driving portion.

The variable groove may include a first variable groove formed at a corner where the edge portion and the first driving portion meet each other, and the short-circuit member may further include a second variable groove formed in a portion where the first driving portion and the second driving portion meet each other, and a third variable groove formed in a portion where the second driving portion and the connection portion meet each other.

A thickness of the connection portion may be greater than a thickness of the support portion.

The connection portion may be configured to rise and contact the short-circuit tab when the internal pressure of the rechargeable battery exceeds a reference pressure.

The support portion may include a driving portion inclined in a direction away from the short-circuit tab, and the connection portion may convexly protrude toward the short-circuit tab. A convex portion of the short-circuit member may be formed at a portion where the support portion and the connection portion meet each other.

The rechargeable battery may be adapted for use as a motor-driving power source for propelling an electric vehicle or a hybrid electric vehicle.

According to an aspect of embodiments of the present invention, the short-circuit member is easily deformed and, thus, an internal short circuit of the rechargeable battery can be induced with low pressure.

BRIEF DESCRIPTION OF THE DRAWINGS

The accompanying drawings, together with the specification, illustrate some exemplary embodiments of the present invention, and, together with the description, serve to explain aspects and principles of the present invention.

| Description of Reference Numerals Indicating Some Elements in the Drawings | |
|---|---|
| 101: rechargeable battery | 10: electrode assembly |
| 11: positive electrode | 11a: positive electrode uncoated region |
| 12: negative electrode | 12a: negative electrode uncoated region |
| 13: separator | 21: positive terminal |
| 22: negative terminal | 25: terminal connection member |
| 25a: column portion | 25b: lower flange portion |
| 25c: lower protrusion | 26: case |
| 30: cap assembly | 31: cap plate |
| 32: electrolyte injection opening | 34: vent hole |
| 37: short-circuit hole | 38: sealing cap |
| 39: vent plate | 39a: notch |
| 41, 42: current collecting tab | 43: lower insulation member |
| 53: short-circuit tab | 54, 59: upper insulation member |
| 55, 65: gasket | 58: short-circuit groove |
| 62: connection plate | 70, 80, 90, 120: short-circuit member |
| 71, 81, 91, 121: connection portion | 72, 82, 92, 122: support portion |
| 73, 83: driving portion | 74: variable groove |
| 75, 85, 95, 125: edge portion | 84, 96, 126: first variable groove |
| 87, 97, 127: second variable groove | 93, 123: first driving portion |
| 94, 124: second driving portion | 98, 128: third variable groove |

DETAILED DESCRIPTION

The present invention is described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
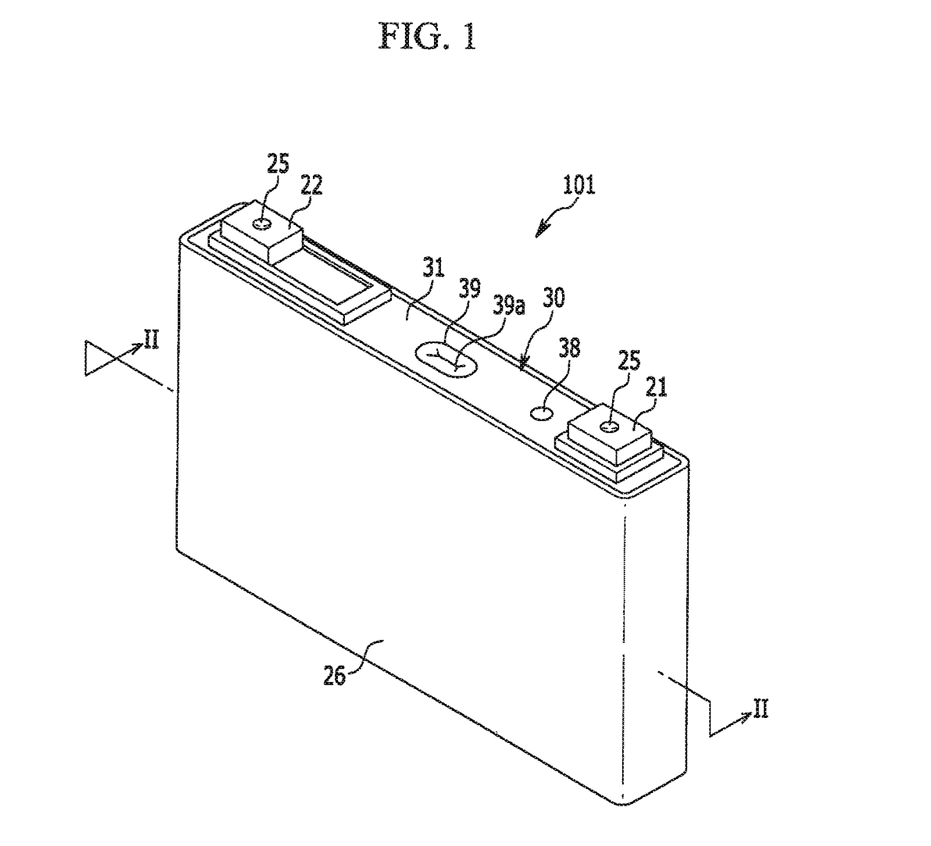
FIG. 1 is a perspective view of a rechargeable battery according to an exemplary embodiment of the present invention.
Figure 2:
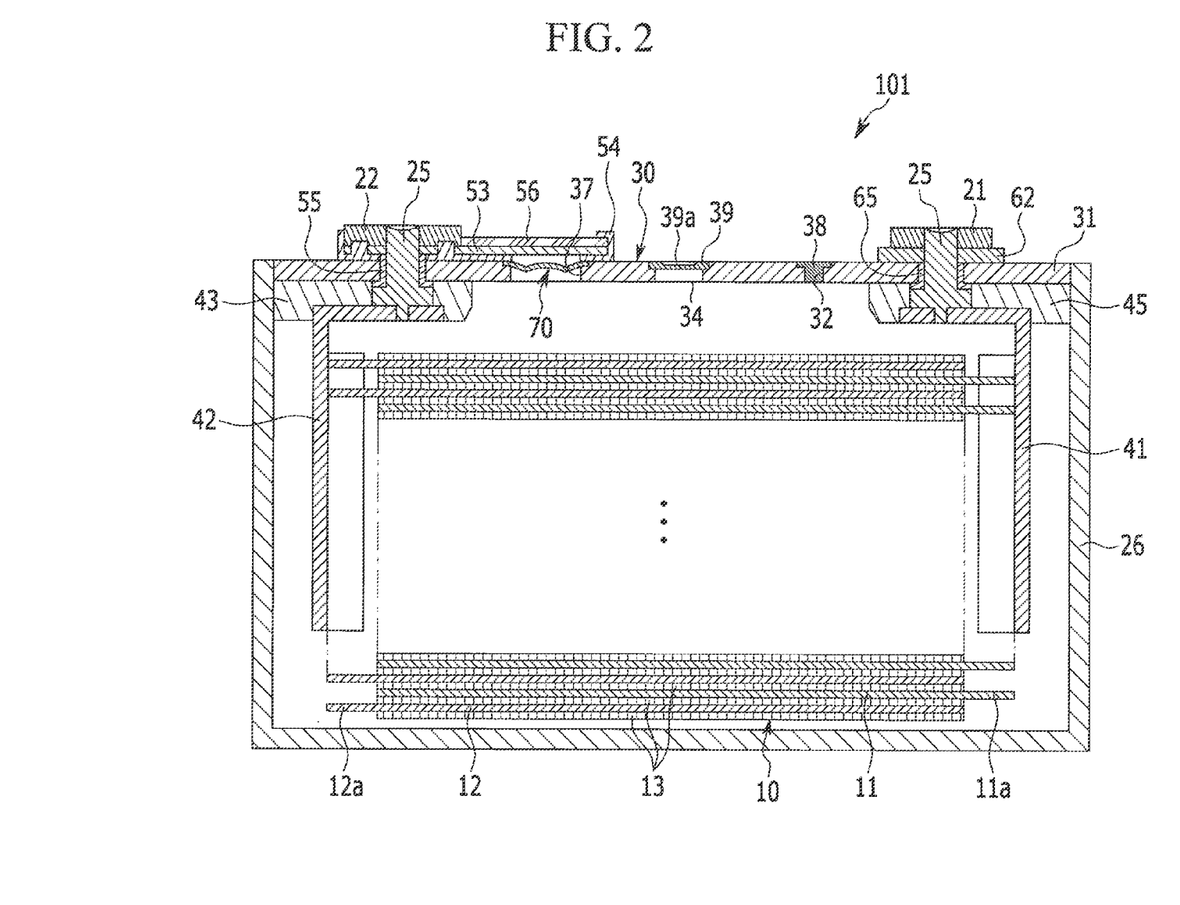
FIG. 2 is a cross-sectional view of the rechargeable battery of FIG. 1, taken along the line II-II.

FIG. 1 is a perspective view of a rechargeable battery according to an exemplary embodiment of the present invention; and FIG. 2 is a cross-sectional view of the rechargeable battery of FIG. 1, taken along the line II-II.

Referring to FIG. 1 and FIG. 2, a rechargeable battery 101 according to an exemplary embodiment of the present invention includes an electrode assembly 10 including a positive electrode 11 and a negative electrode 12 which, in one embodiment, may be spirally wound with a separator 13 interposed between the positive and negative electrodes 11 and 12, a case 26 in which the electrode assembly 10 is installed, and a cap assembly 30 coupled to an opening of the case 26.

The rechargeable battery 101 is illustrated in one exemplary embodiment as a lithium ion rechargeable battery having a prismatic shape. However, the present invention is not limited thereto, and embodiments of the present invention may also be applied to a lithium polymer battery, a cylindrical battery, or the like.

The positive electrode 11 and the negative electrode 12, in one embodiment, include coated regions where an active material is coated to a current collector formed of a thin metal foil, and positive and negative electrode uncoated regions 11a and 12a where the active material is not coated. In one embodiment, the positive electrode uncoated region 11a is formed at a first side end of the positive electrode 11 along a lengthwise direction of the positive electrode 11, and the negative electrode uncoated region 12a is formed at a second side end of the negative electrode 12 along a lengthwise direction of the negative electrode 12. The positive electrode 11 and the negative electrode 12 may be spirally wound with the separator 13 interposed therebetween and being an insulator.

However, the present invention is not limited thereto, and, in another embodiment, the electrode assembly 10 may have a structure in which a positive electrode and a negative electrode, each formed of a plurality of sheets are alternately layered with a separator interposed therebetween, The case 26 may be formed in a generally cuboid shape and having an opening at a side thereof. The case 26 may be formed of a metal, such as aluminum or stainless steel, for example.

The cap assembly 30, in one embodiment, includes a cap plate 31 covering the opening of the case 26, a positive terminal 21 protruding toward an outer side of the cap plate 31 and electrically connected with the positive electrode 11, and a negative terminal 22 protruding toward an outer side of the cap plate 31 and electrically connected to the negative electrode 12.

The cap plate 31 may be formed in the shape of a plate extended in one direction, and coupled to the opening of the case 26. The cap plate 31, in one embodiment, is provided with a sealing cap 38 and a vent plate 39. In one embodiment, the sealing cap 38 is installed in an electrolyte injection opening 32 of the cap plate 131, and the vent plate 39 is in a vent hole 34 of the cap plate 131 and has a notch 39a configured to be broken according to an internal pressure (e.g., a predetermined internal pressure).

The positive terminal 21 and the negative terminal 22 protrude toward an outward direction of the cap plate 31. In one embodiment, the positive terminal 21 is electrically connected to the positive electrode 11 through a current collecting tab 41 and the negative terminal 22 is electrically connected to the negative electrode 12 through a current collecting tab 42.

In one embodiment, a terminal connection member 25 electrically connecting the positive terminal 21 and the current collecting tab 41 is provided between the positive terminal 21 and the current collecting tab 41. In one embodiment, the terminal connection member 25 is inserted in a hole formed in the positive terminal 21, an upper end of the terminal connection member 25 is fixed (e.g., by welding) to the positive terminal 21, and a lower end of the terminal connection member 25 is fixed (e.g., by welding) to the current collecting tab 41.

In one embodiment, a gasket 65 is inserted in a hole through which the terminal connection member 25 penetrates the cap plate 31 and is positioned between the terminal connection member 25 and the cap plate 31 for sealing therebetween, and a lower insulation member 45 into which a lower portion of the terminal connection member 25 is inserted may be provided under the cap plate 31.

In one embodiment, a connection plate 62 that electrically connects the positive terminal 21 and the cap plate 31 is provided in the positive terminal 21. The terminal connection member 25 may be fitted to the connection plate 62, such that the cap plate 31 and the case 26 are charged to the positive electrode 11.

In one embodiment, another terminal connection member 25 is provided between the negative terminal 22 and the current collecting tab 42 for electrical connection therebetween. In one embodiment, the another terminal connection member 25 is inserted in a hole formed in the negative terminal 22, an upper end of the terminal connection member 25 is fixed (e.g., by welding) to the negative terminal 22, and a lower end of the terminal connection member 25 is fixed (e.g., by welding) to the current collecting tab 42.

The another terminal connection member 25, in one embodiment, includes a column portion 25a, a lower flange portion 25b, and a lower protrusion 25c. The column portion 25a penetrates the cap plate 31, and the upper end of the terminal connection member 25 contacts the negative terminal 22 and is fixed thereto. The lower flange portion 25b protrudes outward from a lower end of the column portion 25a, and the lower protrusion 25c, in one embodiment, protrudes downward from the lower end of the column portion 25a and is inserted into the current collecting tab 42 and fixed thereto (e.g., by welding). In one embodiment, a gasket 55 is provided between the negative terminal 22 and the cap plate 31 for sealing therebetween, and a lower insulation member 43 is provided under the cap plate 31 to insulate the negative terminal 22 and the current collecting tab 42 from the cap plate 31.

Referring to FIG. 2, a short-circuit tab 53 is electrically connected to the negative terminal 22 and is provided on the cap plate 31. An upper insulation member 54 is provided between the short-circuit tab 53 and the cap plate 31 for electrical insulation therebetween. The short-circuit tab 53, in one embodiment, has the terminal connection member 25 inserted therein and is disposed between the upper insulation member 54 and the negative terminal 22 and covered by an insulation cover 56.

The cap assembly 30 includes a short-circuit member 70 configured to short circuit the positive electrode 11 and the negative electrode 12, and the short-circuit member 70 is electrically connected with the cap plate 31 and the positive electrode 11. When an internal pressure of the rechargeable battery 101 is increased, the short-circuit member 70 is deformed and thus connected with the short-circuit tab 53 that is electrically connected with the negative electrode 12.

A short-circuit hole 37 is formed in the cap plate 31, and the short-circuit member 70, in one embodiment, is disposed between the upper insulation member 54 and the cap plate 31 in the short-circuit hole 37.

In one embodiment, a short-circuit groove 58 (see FIG. 3) extending to the outside is formed at an upper end of the short-circuit hole 37, and the short-circuit member 70 is partially inserted in the short-circuit groove 58.

Figure 3:
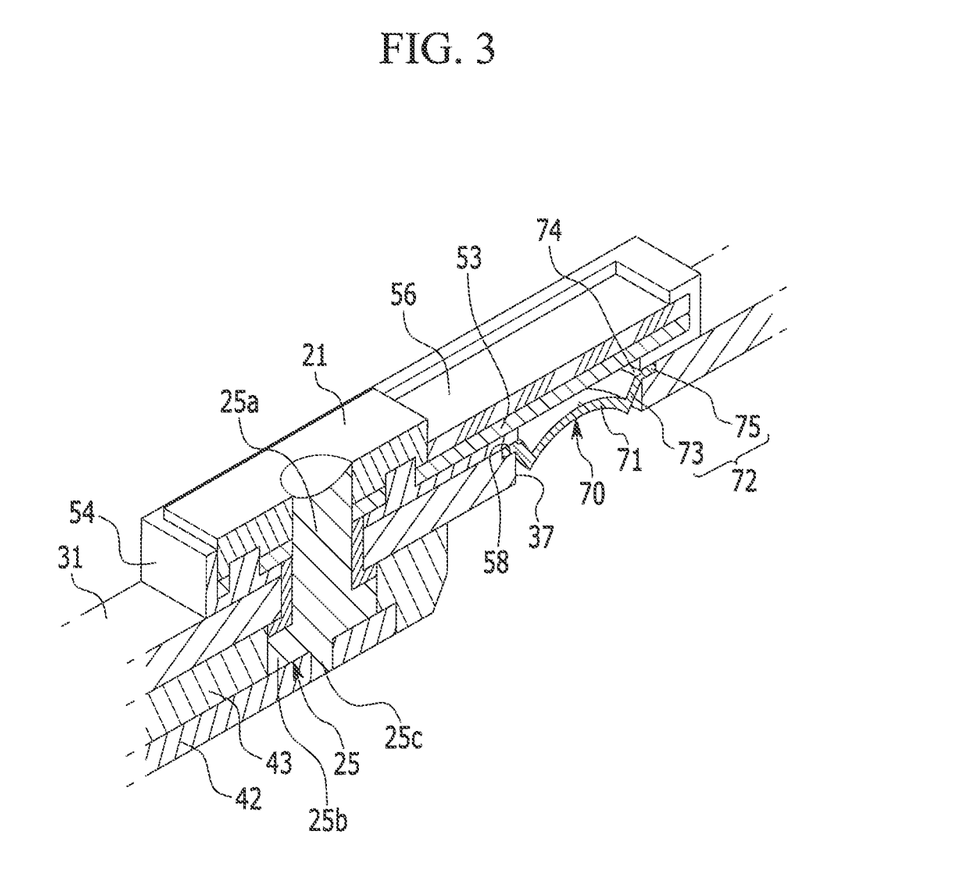
FIG. 3 is a cutaway perspective view of a portion of the rechargeable battery of FIG. 1.
Figure 4:
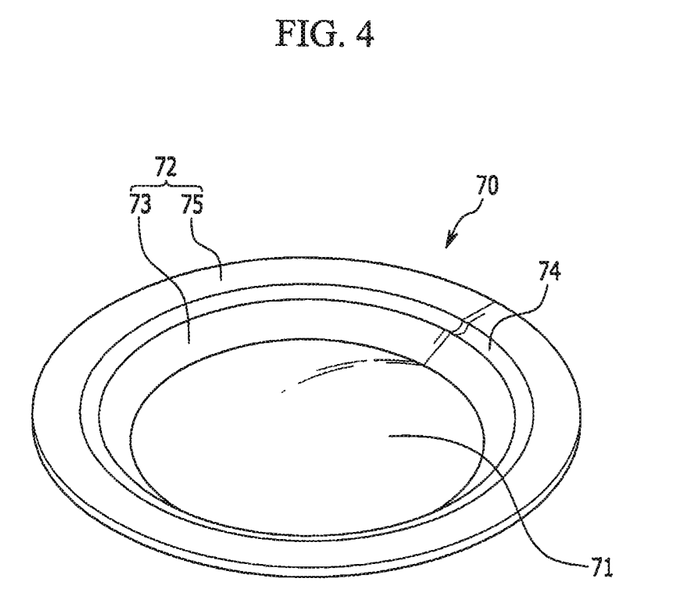
FIG. 4 is a perspective view of a short-circuit member of the rechargeable battery of FIG. 1, according to an exemplary embodiment of the present invention.

As shown in FIG. 3 and FIG. 4, the short-circuit member 70, in one embodiment, is formed in the shape of a circular plate, and includes a connection portion 71 formed in the shape of a plate and a support portion 72 formed at an outer side of the connection portion 71.

The connection portion 71, in one embodiment, has an arc-shaped cross-section convexly protruding toward the short-circuit tab 53. The support portion 72, in one embodiment, includes an edge portion 75 formed in the shape of a ring and a driving portion 73 formed at an inner side of the edge portion 75 and inclined relative to the edge portion 75.

The edge portion 75, in one embodiment, is formed in the shape of a circular ring and is inserted in the short-circuit groove 58. The driving portion 73 is inclined in a downward direction with respect to the edge portion 75, and a variable groove 74 is formed in a corner where the edge portion 75 and the driving portion 73 are connected with each other. The variable groove 74, in one embodiment, is circularly extended along an inner boundary of the edge portion 75.

Figure 5A:
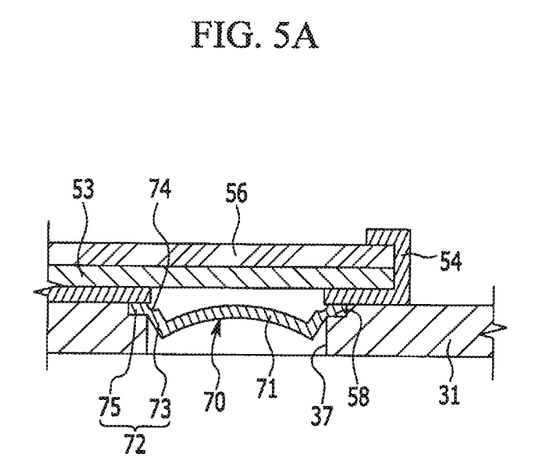
FIG. 5A is a cross-sectional view of a pre-deformation state of the short-circuit member of FIG. 4 in a cap plate of the rechargeable battery of FIG. 1.
Figure 5B:
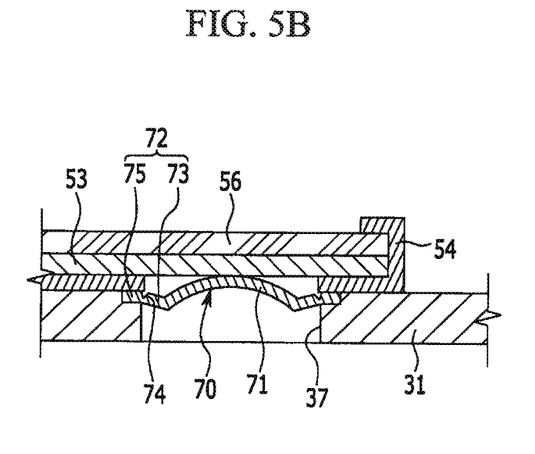
FIG. 5B is a cross-sectional view of a deformed state of the short-circuit member of FIG. 4 in the cap plate of the rechargeable battery of FIG. 1.

As shown in FIG. 5A, the driving portion 73 is initially inclined to a lower direction with respect to the edge portion 75. As shown in FIG. 5B, when the internal pressure of the rechargeable battery 101 is increased, the connection portion 71 rises and the variable groove 74 is deformed to be narrowed. In this case, the driving portion 73 is deformed to decrease an inclination angle with respect to the edge portion 75 upon the rising of the connection portion 71. The connection portion 71 rises until reaching the short-circuit tab 53, and a short circuit occurs when the connection portion 71 contacts the short-circuit tab 53 such that an internal current of the rechargeable battery 101 may be discharged.

As described above, the connection portion 71 rises due to deformation of the variable groove 74 according to an exemplary embodiment of the present invention, and, accordingly, an inner pressure at which a short circuit is caused may be easily set. By contrast, where a short-circuit member is formed of an inverse plate that is downwardly convex, the inverse plate may be deformed due to impact such that an undesired short circuit may occur and, further, a pressure causing the short circuit may not be accurately set.

However, according to embodiments of the present invention, an accurate pressure that causes the short circuit may be easily set using deformation of the variable groove 74, and an occurrence of an undesired short circuit due to external impact and the like can be prevented or substantially prevented. As such, a rechargeable battery according to embodiments of the present invention is suited for application in an electric vehicle or a hybrid electric vehicle.

Figure 6A:
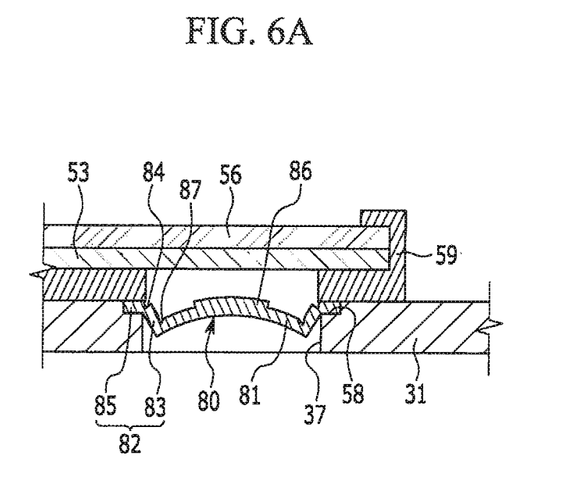
FIG. 6A is a cross-sectional view of a separated state of a short-circuit member and a short-circuit tab of a rechargeable battery according to another exemplary embodiment of the present invention.
Figure 6B:
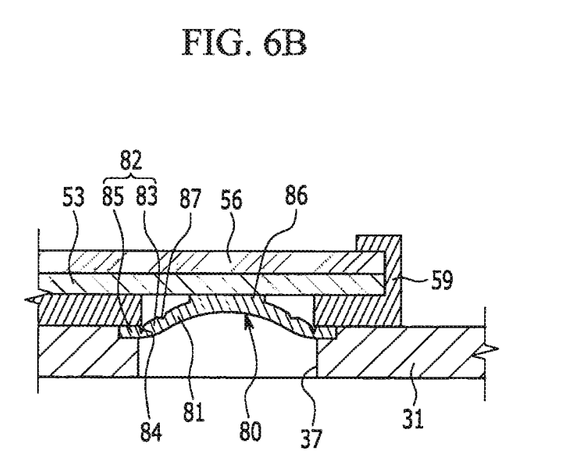
FIG. 6B is a cross-sectional view of a contact state of the short-circuit member and the short-circuit tab of the rechargeable battery of FIG. 6A.

FIG. 6A is a cross-sectional view of a separated state of a short-circuit member and a short-circuit tab of a rechargeable battery according to another exemplary embodiment of the present invention; and FIG. 6B is a cross-sectional view of a contact state of the short-circuit member and the short-circuit tab of the rechargeable battery of FIG. 6A.

Referring to FIG. 6A and FIG. 6B, the rechargeable battery according to another exemplary embodiment is the same as the rechargeable battery 101 in structure, except for the shape of a short-circuit member 80 and the shape of an upper insulation member 59, and, therefore, further description of the same components and structures will not be repeated.

In one embodiment, the short-circuit tab 53 is electrically connected to the negative terminal 22, and the short-circuit tab 53 is provided on the cap plate 31. The upper insulation member 59 is provided between the short-circuit tab 53 and the cap plate 31 for electrical insulation therebetween. The upper insulation member 59 is thicker than the upper insulation member 54 of the rechargeable battery 101 described above.

The short-circuit hole 37 is formed in the cap plate 31, and the short-circuit member 80 is disposed between the upper insulation member 59 and the cap plate 31 in the short-circuit hole 37. In one embodiment, the short-circuit groove 58 is extended to the outside from an upper end of the short-circuit hole 37, and the short-circuit member 80 is partially inserted in the short-circuit groove 58.

The short-circuit member 80 according to an exemplary embodiment is formed in the shape of a circular plate, and includes a connection portion 81 formed in the shape of a plate and a support portion 82 formed at the outside of the connection portion 81.

The connection portion 81, in one embodiment, has an arc-shaped cross-section that convexly protrudes toward the short-circuit tab 53, and a protrusion 86 protruding toward the short-circuit tab 53 is formed at a center portion of the connection portion 81. Accordingly, the center portion of the connection portion 81 is thicker than other portions thereof. Also, in one embodiment, the center portion of the connection portion 81 is thicker than the support portion 82. When the connection portion 81 and the short-circuit tab 53 contact each other, a large amount of heat may be generated due to a flow of overcurrent such that the short-circuit member 80 may be melted. However, interruption of a short circuit due to melting of the short-circuit member 80 may be prevented or substantially prevented by providing the protrusion 86 according to an exemplary embodiment of the present invention.

The support portion 82, in one embodiment, includes an edge portion 85 formed in the shape of a ring and a driving portion 83 formed at an inner side of the edge portion 85 and inclined with respect to the edge portion 85.

The edge portion 85, in one embodiment, is formed in the shape of a circular ring and inserted in the short-circuit groove 58. The driving portion 83 is inclined downward with respect to the edge portion 85. In one embodiment, a first variable groove 84 is formed at a corner where the edge portion 85 and the driving portion 83 are connected with each other, and a second variable groove 87 is formed in a portion where the driving portion 83 and the connection portion 81 meet with, or are connected with, each other.

In one embodiment, the first variable groove 84 is extended along the edge of the driving portion 83, and the second variable groove 87 is extended along the edge of the connection portion 81.

As shown in FIG. 6A, the driving portion 83 is initially inclined downward with respect to the edge portion 85. As shown in FIG. 6B, when an internal pressure of the rechargeable battery is increased, the connection portion 81 rises, the width of the first variable groove 84 is narrowed, and the width of the second variable groove 87 is widened. Meanwhile, the driving portion 83 is deformed to be inclined upward with respect to the edge portion 85 upon the rising of the connection portion 81. The connection portion 81 rises until contacting the short-circuit tab 53, and, in one embodiment, when the connection portion 81 and the short-circuit tab 53 contact each other, the first variable groove 84 has a minimum width and the second variable groove 87 has a maximum width. When the connection portion 81 and the short-circuit tab 53 contact each other, a short circuit occurs such that an internal current of the rechargeable battery may be discharged, and accordingly, the internal pressure of the rechargeable battery can be prevented or substantially prevented from being further increased.

As described above, according to an exemplary embodiment of the present invention, the connection portion 81 rises due to deformation of the first and second variable grooves 84 and 87, and accordingly the connection portion 81 can be easily risen.

Accordingly, the short-circuit member according to embodiments of the present invention may be applied to a small-sized battery having a small capacity. By contrast, where a short-circuit member is formed of an inverse plate that is downwardly convex, the short-circuit member cannot be easily set to be inverted with a low pressure, and when the short-circuit is set to be inverted with a low pressure, the short-circuit member may be deformed by a small external impact.

However, the short-circuit member can be set to be accurately operated with a relatively low pressure according to the above-described exemplary embodiment of the present invention.

Figure 7A:
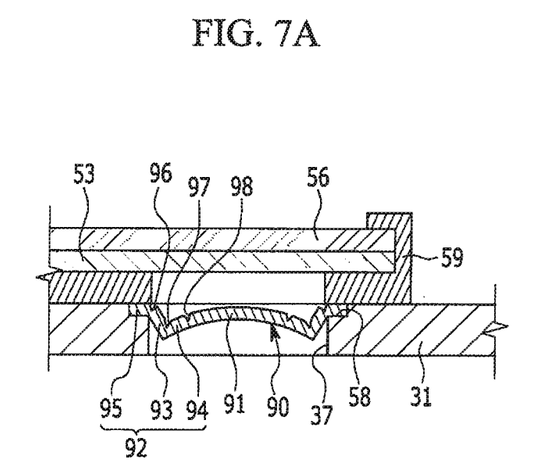
FIG. 7A is a cross-sectional view of an initial installation state of a short-circuit member of a rechargeable battery according to another exemplary embodiment of the present invention.
Figure 7B:
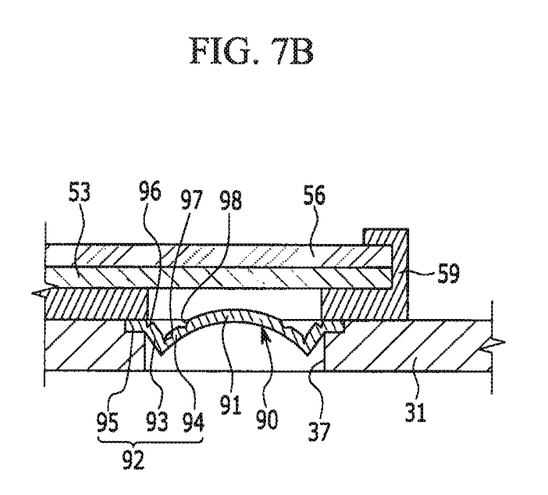
FIG. 7B is a cross-sectional view of a first deformation state of the short-circuit member of the rechargeable battery of FIG. 7A.
Figure 7C:
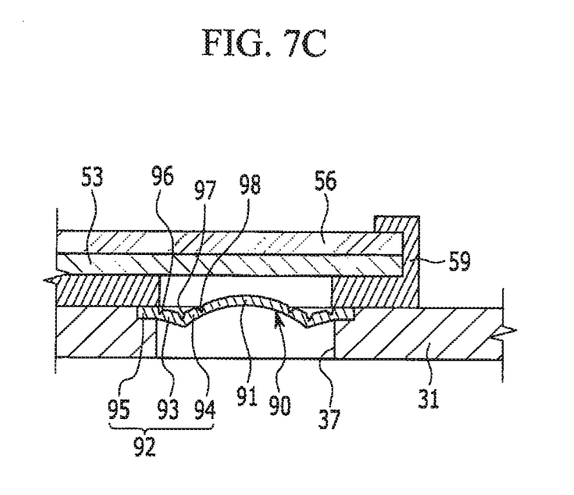
FIG. 7C is a cross-sectional view of a second deformation state of the short-circuit member of the rechargeable battery of FIG. 7A.
Figure 7D:
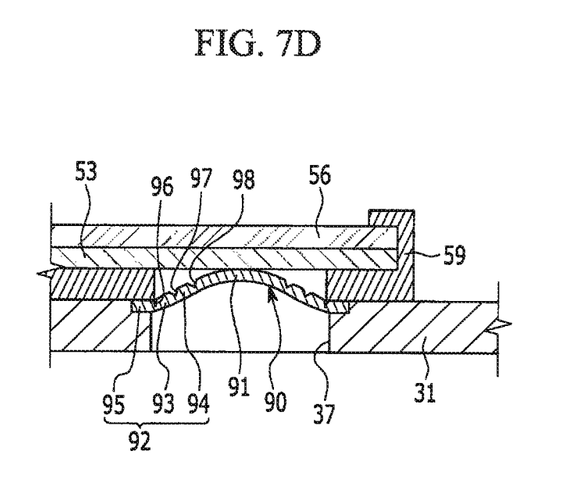
FIG. 7D is a cross-sectional view of a third deformation stage of the short-circuit member of the rechargeable battery of FIG. 7A.

FIG. 7A is a cross-sectional view of an initial installation state of a short-circuit member of a rechargeable battery according to another exemplary embodiment of the present invention; FIG. 7B is a cross-sectional view of a first deformation state of the short-circuit member of the rechargeable battery of FIG. 7A; FIG. 7C is a cross-sectional view of a second deformation state of the short-circuit member of the rechargeable battery of FIG. 7A; and FIG. 7D is a cross-sectional view of a third deformation stage of the short-circuit member of the rechargeable battery of FIG. 7A.

Referring to FIG. 7A to FIG. 7D, a rechargeable battery according to another exemplary embodiment of the present invention is the same as the rechargeable battery of FIGS. 6A and 6B in structure, except for the shape of a short-circuit member 90, and, therefore, further description of the same components and structures will not be repeated.

As shown in FIG. 7A, in one embodiment, the short-circuit tab 53 is electrically connected to the negative terminal 22, and the short-circuit tab 53 is provided on the cap plate 31. The upper insulation member 59 is provided between the short-circuit tab 53 and the cap plate 31 for electrical insulation therebetween.

The short-circuit hole 37 is formed in the cap plate 31, and the short-circuit member 90 is disposed between the upper insulation member 59 and the cap plate 31 in the short-circuit hole 37. In one embodiment, the short-circuit groove 58 is extended to the outside from an upper end of the short-circuit hole 37, and the short-circuit member 90 is partially inserted in the short-circuit groove 58.

The short-circuit member 90 according to an exemplary embodiment is formed in the shape of a circular plate, and includes a plate-shaped connection portion 91 and a support portion 92 formed at the outer side of the connection portion 91.

In one embodiment, the connection portion 91 has an arc-shaped cross-section convexly protruding toward the short-circuit tab 53. In one embodiment, the support portion 92 includes an edge portion 95 formed in the shape of a ring, a first driving portion 93 formed at an inner side of the edge portion 95 and inclined with respect to the edge portion 95, and a second driving portion 94 inclined with respect to the first driving portion 93.

The edge portion 95, in one embodiment, is formed in the shape of a circular ring and inserted in the short-circuit groove 58. The first driving portion 93 is inclined downward with respect to the edge portion 95. The second driving portion 94 is inclined upward with respect to the first driving portion 93, and, thus, a portion where the first driving portion 93 and the second driving portion 94 meet each other is formed in a concave structure.

A first variable groove 96 is formed at a corner where the edge portion 95 and the first driving portion 93 connect with each other, and a second variable groove 97 is formed in a portion where the first driving portion 93 and the second driving portion 94 meet with, or connect with, each other. In addition, a third variable groove 98 is formed in a portion where the second driving portion 94 and the connection portion 91 meet with, or connect with, each other.

In one embodiment, the first variable groove 96 is extended along the edge of the first driving portion 93, the second variable groove 97 is extended along the edge of the second driving portion 94, and the third variable groove 98 is extended along the edge of the connection portion 91.

As shown in FIG. 7A, the first driving portion 93 is initially inclined downward with respect to the edge portion 95. As shown in FIG. 7B, when an internal pressure of the rechargeable battery is increased, the connection portion 91 rises upward, the width of the second variable groove 97 is narrowed, and the width of the third variable groove 98 is widened.

As shown in FIG. 7C, when the internal pressure of the rechargeable battery is further increased, the connection portion 91 rises further, the width of the first variable groove 96 is narrowed, and the width of the second variable groove 97 is widened in comparison to the state shown in FIG. 7B.

In one embodiment, when the internal pressure of the rechargeable battery reaches a reference pressure that causes a short circuit, the width of the first variable groove 96 is minimized, and the widths of the second and third variable grooves 97 and 98 are further widened, and the connection portion rises until reaching the short-circuit tab as shown in FIG. 7D.

As described above, in the short-circuit member 90 according to an exemplary embodiment of the present invention, the connection portion 91 rises due to deformation of the first, second, and third variable grooves 96, 97, and 98 such that the connection portion 91 can easily be risen.

Figure 8:
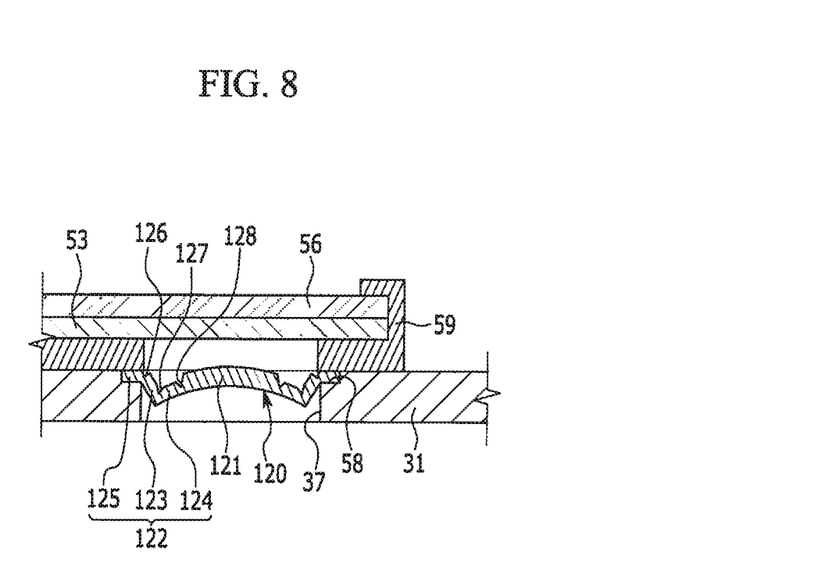
FIG. 8 is a partial cross-sectional view of a rechargeable battery according to another exemplary embodiment of the present invention.

FIG. 8 is a partial cross-sectional view of a rechargeable battery according to another exemplary embodiment of the present invention.

The rechargeable battery of FIG. 8 according to another exemplary embodiment of the present invention is the same as the rechargeable battery of FIGS. 6A and 6B, except for the shape of a short-circuit member 120, and, therefore, further description of the same components and structures will not be repeated.

The short-circuit member 120 according to another exemplary embodiment is formed in the shape of a circular plate and includes a plate-shaped connection portion 121 and a support portion 122 formed at an outer side of the connection portion 121.

In one embodiment, the connection portion has an arc-shaped cross-section convexly protruding toward the short-circuit tab 53, and the connection portion 121 is thicker than the support portion 122. Because the connection portion 121 is thicker than the support portion 122, when an overcurrent flows from contact of the connection portion 121 and the short-circuit tab 53, melting of the short-circuit member 120 may be prevented or substantially prevented. Further, when the support portion 122 is thinner than the connection portion 121, the support portion 122 can be further easily deformed.

In one embodiment, the support portion 122 includes an edge portion 125 formed in the shape of a ring, a first driving portion 123 formed at an inner side of the edge portion 125 and inclined downward with respect to the edge portion 125, and a second driving portion 124 inclined upward with respect to the first driving portion 123.

In one embodiment, the edge portion 125 is formed in the shape of a circular ring and inserted in the short-circuit groove 58. The first driving portion 123 is inclined downward with respect to the edge portion 125. The second driving portion 124 is inclined upward with respect to the first driving portion 123 such that a portion where the first driving portion 123 and the second driving portion 124 meet with, or connect with, each other is formed in a concave structure.

A first variable groove 126 is formed at a corner where the edge portion 125 and the first driving portion 123 connect with each other, and a second variable groove 127 is formed in a portion where the first driving portion 123 and the second driving portion 124 meet with, or connect with, each other. Further, a third variable groove 128 is formed in a portion where the second driving portion 124 and the connection portion 121 meet with, or connect with, each other.

In one embodiment, the first variable groove 126, the second variable groove 127, and the third variable groove 128 are circularly extended, the second variable groove 127 is formed at an inner side of the first variable groove 126, and the third variable groove 128 is formed at an inner side of the second variable groove 127.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
    an electrode assembly comprising a first electrode and a second electrode;
    a case containing the electrode assembly;
    a cap plate coupled to the case;
    a short-circuit tab electrically connected to the first electrode; and
    a short-circuit member electrically connected to the second electrode and configured to contact the short-circuit tab according to an increase of an internal pressure of the rechargeable battery,
    wherein the short-circuit member comprises a connection portion having a plate shape, a support portion at an outer side of the connection portion, and a variable groove having a shape that is configured to change according to the increase of the internal pressure, and
    wherein the connection portion is configured to rise from a pre-deformation state in which the connection portion has an arc-shaped cross-section protruding toward the short-circuit tab to a deformed state and contact the short-circuit tab when the internal pressure of the rechargeable battery exceeds a reference pressure.

2. The rechargeable battery of claim 1, wherein the support portion comprises an edge portion having a ring shape, and a driving portion at an inner side of the edge portion and inclined with respect to the edge portion.

3. The rechargeable battery of claim 2, wherein the variable groove is formed at a corner where the edge portion and the driving portion meet each other.

4. The rechargeable battery of claim 3, wherein a width of the variable groove decreases as the connection portion rises according to the increase of the internal pressure.

5. The rechargeable battery of claim 2, wherein the variable groove comprises a first variable groove formed at a corner where the edge portion and the driving portion meet each other, and the short-circuit member further comprises a second variable groove formed in a portion where the connection portion and the driving portion meet each other.

6. The rechargeable battery of claim 1, wherein the short-circuit member is partially inserted in a short-circuit groove formed in the cap plate, and electrically connected with the second electrode through the cap plate.

7. A rechargeable battery comprising:
an electrode assembly comprising a first electrode and a second electrode;
a case containing the electrode assembly;
a cap plate coupled to the case;
a short-circuit tab electrically connected to the first electrode: and a short-circuit member electrically connected to the second electrode and configured to contact the short-circuit tab according to an increase of an internal pressure of the rechargeable battery,
wherein the short-circuit member comprises a connection portion having a plate shape, a support portion at an outer side of the connection portion, and a variable groove having a shape that is configured to change according to the increase of the internal pressure,
wherein the connection portion is configured to rise from a pre-deformation state in which the connection portion has an arc-shaped cross-section protruding toward the short-circuit tab to a deformed state and contact the short-circuit tab when the internal pressure of the rechargeable battery exceeds a reference pressure, and
wherein the connection portion comprises a protrusion at a center portion of the connection portion such that a thickness of the center portion of the connection portion is greater than a thickness of a peripheral portion of the connection portion.

8. The rechargeable battery of claim 1, wherein the support portion comprises an edge portion having a ring shape, a first driving portion at an inner side of the edge portion and inclined with respect to the edge portion, and a second driving portion at an inner side of the first driving portion and inclined with respect to the first driving portion.

9. The rechargeable battery of claim 8, wherein the variable groove comprises a first variable groove formed at a corner where the edge portion and the first driving portion meet each other, and the short-circuit member further comprises a second variable groove formed in a portion where the first driving portion and the second driving portion meet each other, and a third variable groove formed in a portion where the second driving portion and the connection portion meet each other.

10. The rechargeable battery of claim 1, wherein a thickness of the connection portion is greater than a thickness of the support portion.

11. The rechargeable battery of claim 1, wherein the support portion comprises a driving portion inclined in a direction away from the short-circuit tab, and the connection portion convexly protrudes toward the short-circuit tab.

12. The rechargeable battery of claim 11, wherein a convex portion of the short-circuit member is formed at a portion where the support portion and the connection portion meet each other.

13. The rechargeable battery of claim 1, wherein the rechargeable battery is adapted for use as a motor-driving power source for propelling an electric vehicle or a hybrid electric vehicle.

* * * * *